United States Patent [19]

Ohno et al.

[11] Patent Number: 5,055,222
[45] Date of Patent: * Oct. 8, 1991

[54] α-SUBSTITUTED-PROPIONIC ACID ESTERS

[75] Inventors: Kouji Ohno; Shinichi Saito; Takashi Inukai; Hiromichi Inoue; Kazutoshi Miyazawa, all of Kanagawa, Japan

[73] Assignee: Chisso Corporation, Osaka, Japan

[*] Notice: The portion of the term of this patent subsequent to Oct. 24, 2006 has been disclaimed.

[21] Appl. No.: 408,950

[22] Filed: Sep. 18, 1989

Related U.S. Application Data

[62] Division of Ser. No. 119,067, Nov. 10, 1987, abandoned.

[30] Foreign Application Priority Data

Nov. 10, 1986 [JP] Japan .................. 61-267206
Dec. 26, 1986 [JP] Japan .................. 61-313310

[51] Int. Cl.$^5$ .................................. C09K 19/34
[52] U.S. Cl. .................. 252/299.61; 252/299.01; 546/342; 546/301; 359/104; 359/106
[58] Field of Search ............ 252/299.01, 299.61; 350/350 S; 546/342, 301

[56] References Cited

U.S. PATENT DOCUMENTS

| | | | |
|---|---|---|---|
| 4,592,858 | 6/1986 | Higuchi et al. | 252/299.66 |
| 4,613,209 | 9/1986 | Goodby et al. | 350/350 S |
| 4,650,600 | 5/1987 | Heppke et al. | 252/299.01 |
| 4,695,651 | 9/1987 | Higuchi et al. | 252/299.66 |
| 4,723,018 | 2/1988 | Shinozaki et al. | 252/299.61 |
| 4,725,688 | 2/1988 | Taguchi et al. | 252/299.61 |
| 4,732,699 | 3/1988 | Higuchi et al. | 252/299.66 |
| 4,744,918 | 5/1988 | Heppke et al. | 252/299.61 |
| 4,775,223 | 10/1988 | Yoshinaga et al. | 252/299.61 |
| 4,834,904 | 5/1989 | Krause et al. | 252/299.61 |
| 4,876,026 | 10/1989 | Saito et al. | 252/299.61 |

FOREIGN PATENT DOCUMENTS

| | | | |
|---|---|---|---|
| 164814 | 12/1985 | European Pat. Off. | 252/299.66 |
| 175591 | 3/1986 | European Pat. Off. | 252/299.61 |
| 63-44551 | 2/1988 | Japan . | |
| 63-63664 | 3/1988 | Japan . | |
| 87/05012 | 8/1987 | World Int. Prop. O. . | |
| 88/03525 | 5/1988 | World Int. Prop. O. . | |

OTHER PUBLICATIONS

Goodby et al., Liquid Crystals & Ordered Fluids, vol. 4, pp. 1-32 (1984).

Primary Examiner—John B. Maples
Assistant Examiner—Richard Treanor
Attorney, Agent, or Firm—Wenderoth, Lind & Ponack

[57] ABSTRACT

An optically active compound exhibiting high speed response properties when used as a component of liquid crystal materials used in a liquid crystal display mode utilizing ferroelectricity, and a liquid crystal composition containing the compound are provided, which compound is expressed by the formula

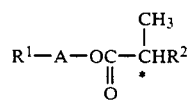

wherein $R^1$ represents alkyl, alkoxy or alkoxycarbonyl each of 2 to 18 C, $R^2$ represents alkyl of 3 to 18 C or alkoxy of 1 to 18 C and A represents a member selected from a group of two directly bonded six-membered rings having a halogen atom, cyano group, methyl group or trifluoromethyl group attached thereonto and * represents an unsymmetric carbon atom.

5 Claims, No Drawings

α-SUBSTITUTED-PROPIONIC ACID ESTERS

This application is a division of now abandoned application, Ser. No. 07/119,067 filed on Nov. 10, 1987 now abandoned.

BACKGROUND OF THE INVENTION

1. Field of the Invention

This invention relates to a novel compound suitable as a component of liquid crystal compositions, and more particularly it relates to a chiral compound having an optically active group and a liquid crystal composition containing the same, particularly a ferroelectric liquid crystal composition.

2. Description of the Related Art

At present, TN (twisted nematic) mode display has been most broadly employed as liquid crystal display elements, but it is inferior in the aspect of the response rate to emissive mode display elements (electroluminescence, plasma display, etc.); hence various improvements in this respect have been attempted, but it does not appear that a possibility of improvement to a large extent remains. Thus, various liquid crystal display devices based on another principle in place of that of TN mode display elements have been attempted, and as one such device, there is a display mode making use of ferroelectric liquid crystals (N. A. Clark et al, Applied Phys. lett., 36,899 (1980)). This mode makes use of chiral smectic phases such as chiral smectic C phase (hereinafter abbreviated to SC* phase), and the temperature range exhibiting these phases is preferred to be in the vicinity of room temperature. In addition, as liquid crystal phases exhibiting ferroelectricity, not only SC* phase but also chiral smectic F, G, H, I, J, etc. phases have been known.

In order to search for compounds having superior characteristics as a component of liquid crystal materials used for liquid crystal display mode making use of the ferroelectricity, the present inventors have extensively searched for a large number of compounds and have attained the present invention.

SUMMARY OF THE INVENTION

The present invention resides in: an optically active compound expressed by the formula

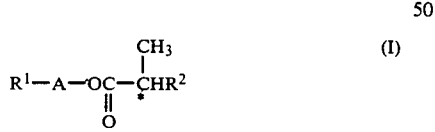

wherein $R^1$ represents an alkyl group, an alkoxy group or an alkoxycarbonyl group each of 2 to 18 carbon atoms, $R^2$ represents an alkyl group of 3 to 18 carbon atoms or an alkoxy group of 1 to 18 carbon atoms, A represents

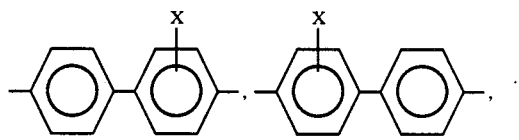

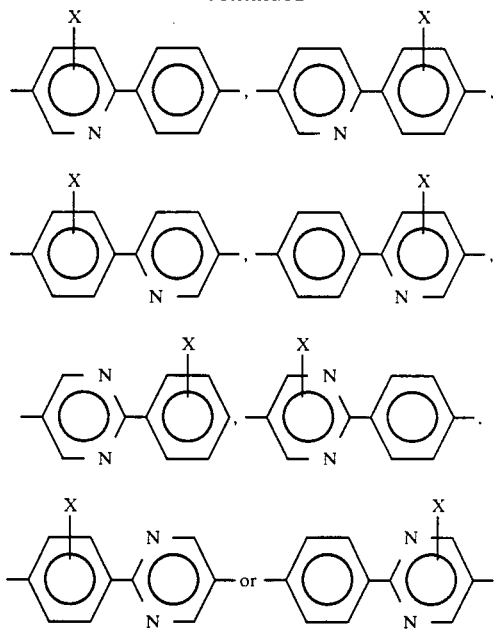

wherein X represents hydrogen atom, fluorine atom, chlorine atom, cyano group, methyl group or trifluoromethyl group, and the symbol * represents an unsymmetric carbon atom, and a liquid crystal composition containing at least one of the above-mentioned optically active compounds.

DESCRIPTION OF PREFERRED EMBODIMENTS

The compound of the formula (I) can be roughly classified into the following two compounds:

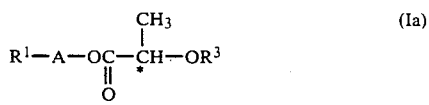

wherein $R^3$ represents an alkyl group of 1 to 18 carbon atoms, and

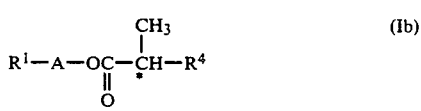

wherein $R^4$ represents an alkyl group of 3 to 18 carbon atoms. $R^3$ and $R^4$ are both preferred to be in the range of 3 to 8. Further, preferred examples of A are

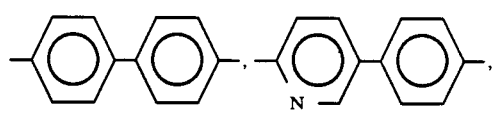

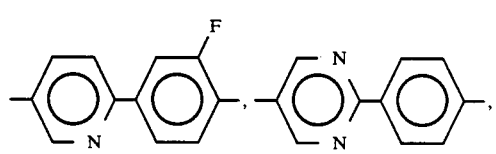

-continued

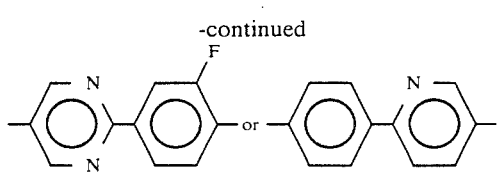

Representative examples of the compound of the formula (I) and their phase transition points are shown in Table 1.

TABLE 1

| Sample No. | R¹ (in formula I) | —A— | R² | Absolute configuration | Phase transition point (°C.) C | SA | I | Note | |
|---|---|---|---|---|---|---|---|---|---|
| 1 | $C_8H_{17}-$ | biphenyl | $-OC_3H_7$ | S | • 43.8 | — | ⊚ | (Ia) | Example 1 |
| 2 | $C_8H_{17}O-$ | biphenyl | $-OC_6H_{13}$ | S | • 61.8 | — | ⊚ | " | |
| 2 | $C_2H_5OC(O)-$ | biphenyl | $-OC_4H_9$ | R | • 36.5 | — | ⊚ | " | |
| 4 | $C_9H_{19}-$ | pyridyl-phenyl | $-OC_3H_7$ | S | • 58.3 | — | ⊚ | " | Example 2 |
| 5 | $C_9H_{19}-$ | pyridyl-(F)phenyl | $-OC_3H_7$ | S | • 22.8 | (• 9.2) | ⊚ | " | |
| 6 | $C_9H_{19}-$ | pyridyl-(F)phenyl | $-OC_6H_{13}$ | S | • 34.5 | — | ⊚ | " | |
| 7 | $C_8H_{17}-$ | pyrimidyl-phenyl | $-OC_3H_7$ | S | • 13.0 | — | ⊚ | " | |
| 8 | $C_8H_{17}-$ | pyrimidyl-(F)phenyl | $-OC_3H_7$ | S | • 14.4 | — | ⊚ | " | |
| 9 | $C_7H_{15}-$ | phenyl-pyrimidyl | $-OC_4H_9$ | R | • 39.4 | — | ⊚ | " | |
| 10 | $C_7H_{15}O-$ | phenyl-pyrimidyl | $-OC_4H_9$ | R | • 39.5 | — | ⊚ | " | |
| 11 | $C_8H_{17}$ | pyrimidyl-phenyl | $-C_6H_{13}$ | S | • 36.2 | — | ⊚ | (Ih) | Example 3 |

TABLE 1-continued

| Sample No. | In formula (I) R¹ | —A— | R² | Absolute configuration | Phase transition point (°C.) C | SA | I | Note |
|---|---|---|---|---|---|---|---|---|
| 12 | $C_4H_9O-$ | 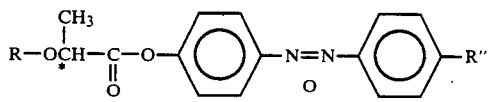 | $-C_6H_{13}$ | S | • 44.0 | — | • | " |
| 13 | $C_6H_{13}-$ | (pyrimidine ring) | $-C_6H_{13}$ | S | • 23.0 | — | • | " |
| 14 | $C_{10}H_{21}-$ | (pyridine ring) | $-C_6H_{13}$ | S | • 44.6 | — | • | " |

Most of the compounds of the formula (I) of the present invention singly exhibit no liquid crystal phase, but in any case, they have a first specific feature that their spontaneous polarization values Ps (or latent spontaneous polarization values) are large. A second specific feature is that since they have two directly bonded rings as the central groups thereof, they are optically stable and have a lower viscosity η than of compounds which are similar thereto but have a bonding group between the respective rings, e.g. a compound disclosed in Japanese patent application laid-open No. Sho 61-76438/1986, $$R-O\overset{*}{C}H-\underset{O}{\overset{CH_3}{\underset{\|}{C}}}-O-\bigcirc-N=N-\bigcirc-R''$$

wherein R represents a hydrocarbon radical and R" represents an alkyl group or an alkoxy group. The response rates τ of ferroelectric liquid crystal compounds and compositions are expressed by the following equation (II):

$$\tau = \frac{\eta}{Ps \cdot E} \quad (II)$$

η: viscosity
E: electric field strength

As apparent from the equation (II), in order to raise τ, it is necessary to increase Ps or reduce η. When the compound of the present invention is used as a component of chiral smectic liquid crystal compositions together with achiral smectic liquid crystal compounds or chiral smectic liquid crystal compounds, it is possible to notably increase the Ps of the compositions. So to speak, the compound of the present invention may be said to be a compound having a function of increasing Ps in chiral smectic liquid crystals. For example, as described later in Examples, when a compound of the formula (Ia) of the present invention is added in an amount of 20% by weight to a liquid crystal composition exhibiting an achiral smectic C phase, it is possible to obtain a response time of 34 μsec at 25° C.

Further, when a compound of the formula (I) of the present invention is added in a small amount to a liquid crystal composition exhibiting SC* phase but having a notably small Ps, it is possible to raise its Ps up to a practically large value.

Still further, when the compound of the present invention is added to a nematic liquid crystal composition, it has an effectiveness of dissolving its reverse domain.

Next, preparation of the compound of the formula (I) of the present invention will be described.

Among the compounds of the formula (I), those of the formula (Ia) may be prepared for example according to the following equations:

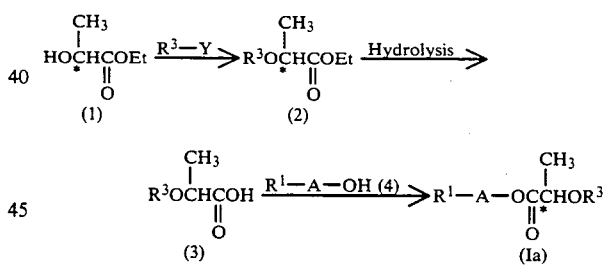

wherein Y represents Cl, Br or I and R¹, R³ and —A— are each as defined above.

Further, the compounds of the formula (Ia) may be prepared through the following route:

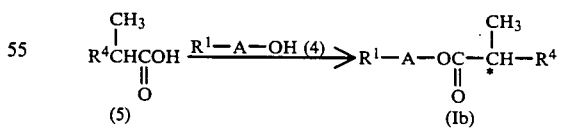

The acid (5), i.e. optically active-2-methylalkanoic acids in the above route may be prepared by acetalizing a 2-hydroxy-4-alkenyl-3-one prepared from an alkynyl or alkenyl metal (MgX, Li, etc.) reagent and N,N-dimethyllactic acid amide to obtain a 2-hydroxy-4-alkenyl-3-one acetal, heating this compound with sodium acetate in an aqueous methanol to obtain a 2-methyl-alkenic acid ester, further catalytically hydrogenating this compound to obtain a 2-methyl-alkanoic acid ester and hydrolyzing this ester (Japan Chemical Society, the 48th Further, the above acid (5) may also be prepared through the following route:

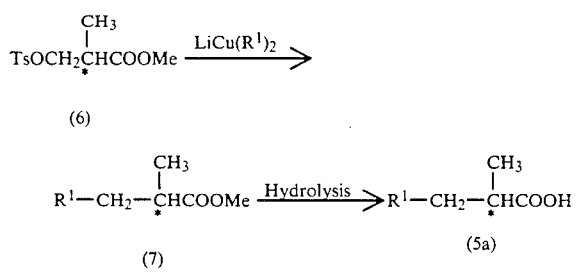

wherein R¹—CH— is a group equivalent to R⁴ of the above acid (5a).

The compound and liquid crystal composition of the present invention will be described in more detail by way of Examples.

Example 1

Preparation of 4'-octyl-4-(2'-propoxypropanoyloxy)-biphenyl (a compound of the formula (I) wherein R¹ represents octyl, R² represents propoxy and —A— represents

(i) Preparation of S-2-propoxypropionic acid

Silver oxide (48 g, 0.07 mol) was added to a mixture of ethyl L-(+)-lactate (47 g, 0.4 mol) with 1-iodopropane (100 g, 0.6 mol) over 2 hours, followed by allowing the resulting mixture to stand at room temperature for 3 days, diluting it with ether (30 ml), filtering, distilling off ether, washing the residue with 2N-NaOH aqueous solution, drying over anhydrous MgSO₄, and distilling off unreacted ethyl L-(+)-lactate to obtain ethyl S-2-propoxypropionate (15 g).

A mixture of this product (15 g) with 5N-NaOH aqueous solution (40 ml) was agitated at room temperature for 4 hours, followed by adding ether (100 ml) and water (50 ml), washing the resulting organic layer with water until the washing water became neutral, and distilling off the solvent under reduced pressure to obtain S-2-propoxypropionic acid (8 g).

(ii) Preparation of the captioned compound

A mixture of 4'-hydroxy-4-octylbiphenyl (4.6 g), dicyclohexylcarbodiimide (hereinafter abbreviated to DCC) (5.8 g) and dimethylaminopyridine (hereinafter abbreviated to DMAP) (0.4 g) was dissolved in dichloromethane (80 ml), followed by adding S-2-propoxypropionic acid obtained above (3.0 g) to the solution, agitating the mixture at room temperature for 5 hours, filtering off the resulting deposited crystals, adding toluene (50 ml) and water (30 ml) to the filtrate, washing the resulting organic layer with water, distilling off the solvent and recrystallizing the residue from ethanol to obtain the objective S-4'-octyl-4-(2'-propoxypropanoyloxy)biphenyl (2.0 g) having a m.p. of 43.8° C.

Example 2

Preparation of S-5-nonyl-2-(4-propoxypropanoyloxyphenyl)pyridine (a compound of the formula (I) wherein R¹ represents nonyl, R² represents propoxy and —A— represents

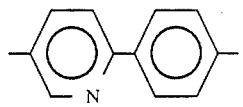

A mixture of 4-(5-nonyl-pyridine-2-yl)phenol (4.8 g) prepared according to the method of a known literature (A.I. Pavulchenko et al, "Advance in Liquid Cryst Research and Applications" edited by L. Bata, Pergamon Press, 1980, page 1007), DCC (5.8 g) and DAMP (0.4 g) was dissolved in dichloromethane (80 ml), followed by adding S-2-propoxypropionic acid prepared in Example 1 (i) (3 g) to the solution, agitating the mixture at room temperature for 4 hours, filtering off deposited crystals, adding toluene (50 ml) and water (30 ml) to the filtrate, washing the resulting organic layer with water, distilling off the solvent and recrystallizing the residue from ethanol to obtain the objective S-2-propyloxypropionic acid 4-(5'-nonylpyridyl-2')-phenyl ester (0.7 g) having a m.p. of 58.3 g.

Example 3

Preparation of S-2-(4'-(2-methyloctanoyloxy)-phenyl)-5-octylpyrimidine (a compound of the formula (I) wherein R¹ represents octyl, R² represents hexyl and A represents

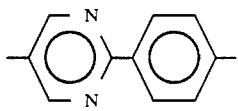

1) Preparation of S-2-methyloctanoic acid

Ethyl S-lactate (185 g, 1.57 mol) and anhydrous dimethylamine (100 g, 2.22 mol) were placed in a pressure glass tube and heated at 80° C. for 60 hours, followed by distilling off the reaction material under reduced pressure to obtain N,N-dimethyl lactic acid amide (163.6 g) having a b.p. of 69°–70° C./2 mmHg). (Yield: 89.1%).

This N,N-dimethyl lactic acid amide (136.2 g, 1.16 mol) was dissolved in anhydrous dichloromethane (300 ml), followed by adding ethyl vinyl ether (126 g, 1.75 mol) to the solution, further adding a solution (200 ml) of pyridium p-toluenesulfonate (15 g, 60 mmol) in anhydrous dichloromethane, agitating the mixture under ice-cooling for one hour, further agitating it at room temperature for 4 hours, again cooling it with ice, adding thereto solid sodium hydrogen carbonate (6.0 g, 71 mmol) as it was, agitating the mixture under ice-cooling for 30 minutes, distilling off the solvent dichloromethane, purifying the residue according to a column chromatography using silica gel (100 g) and a mixed solution of acetone and heptane (1:3) as an elute and distilling the resulting material under reduced pressure to obtain o-(1-ethoxyethyl)-N,N-dimethyl lactic acid amide having a b.p. of 93°–98° C./5–6 mmHg (201.8 g). Yield: 91.9%, $[\alpha]_D^{26}(-)$ 56.07° (neat).

A solution (300 ml) of 1-hexyne (17.4 g, 0.21 mol) in anhydrous THF was cooled down to −70° C., followed by adding a hexane solution (140 ml) of n-butyllithium (1.55 M), agitating the mixture at −70° C. for one hour, adding to this solution, a solution (200 ml) of o-(1-ethoxyethyl)-N,N-dimethyl lactic acid amide (40 g, 0.21 mol) in anhydrous THF, agitating the mixture at −70° C. for 2 hours, adding thereto a solution of ammonium chloride (22.5 g) dissolved in water (200 ml), allowing the mixture to stand up to room temperature, extracting it with n-heptane (300 ml), washing with water, distilling off the solvent, adding 1,4-dioxane (200 ml) and 6N-hydrochloric acid (30 ml) to the residue, sufficiently shaking the mixture for one hour, extracting it with dichloromethane (300 ml), washing the resulting organic layer with an acid, then with an alkali and further with water until the washing water became neutral, drying over anhydrous magnesium sulfate, distilling off the solvent and distilling the residue under reduced pressure to obtain S-2-hydroxy-4-nonyn-3-one having a b.p. of 66°–67° C./3 mmHg (17 g). Yield: 52.5%.

The total amount of this product (17 g, 0.11 mol) was dissolved in anhydrous dichloromethane (200 ml), followed by adding to the solution, 1,3-bis(trimethylsilyloxy)-2,2-dimethylpropane of a b.p. of 85°–88° C./23 mmHg (30 g) derived from 2,2-dimethyl-1,3-propanediol, cooling the mixture with ice, adding thereto trifluoromethanesulfonic acid trimethylsilyl ester (0.1 g), agitating the mixture for one hour, adding dichloromethane (200 ml), washing the mixture with an acid, then with an alkali and further with water until the washing water became neutral, drying over anhydrous magnesium sulfate, distilling off the solvent and distilling the residue under reduced pressure to obtain S-2-hydroxy-4-nonyn-3-one-2,2-dimethyltrimethylene acetal having a b.p. of 136°–138° C./6 mmHg (18 g). Yield: 67.9%. $[\alpha]_D^{25}$ (−) 16.4° (neat).

This product (11 g) was hydrogenated using quinolinepoisoned 5% palladium supported on barium sulfate as catalyst in heptane solvent to obtain S-2-hydroxy-4-nonen-3-one-2,2-dimethyltrimethylene acetal (11 g).

This product (11 g) was dissolved in anhydrous dichloromethane (100 ml), followed by adding pyridine (20 ml), cooling the mixture with ice, dropwise adding methanesulfonyl chloride (7 g), agitating the mixture overnight, adding dichloromethane (100 ml) and washing the resulting organic layer with an acid, then with an alkali and further with water until the washing water became neutral to obtain a methanesulfonic acid ester (16 g).

This product (16 g) and sodium acetate trihydrate (7.5 g) were added to methanol (70 ml) and water (30 ml), followed by heating the mixture under reflux for 20 hours, adding dichloromethane (100 ml) and water (200 ml), washing the resulting organic layer with an acid, then with an alkali and further with water until the washing water became neutral, drying over anhydrous magnesium sulfate, distilling off the solvent and distilling the residue under reduced pressure to obtain S-2-methyl-3-cis-octenoic acid-3-hydroxy-2,2-dimethylpropyl ester having a b.p. of 122°–124° C./2 mmHg (8.4 g). Yield: 76.4%. $[\alpha]_D^{24}$(+) 131° (1.90 CHCl$_3$).

This product (3 g) was hydrogenated with 5% palladium-carbon catalyst in methanol, followed by heating the resulting material in 6N hydrochloric acid for 3 hours, extracting the resulting material with dichloromethane (200 ml), washing with water and distilling off the solvent to obtain S-2-methyloctanoic acid (2.0 g). The proton NMR of this product was as follows:

| (CDCl$_3$ solution, TMS internal standard) | | |
| --- | --- | --- |
| δ(ppm) | | |
| 11.73 | s | 1 H |
| 2.43 | m | 1 H |
| 2.05~0.70 | m | 16 H |

2) Preparation of the captioned compound

S-2-methyloctanoic acid prepared in the above 1) (0.5 g), 2-(4'-hydroxyphenyl)-5-octylpyrimidine (0.8 g), DCC (0.7 g) and DMAP (0.1 g) were agitated in anhydrous dichloromethane (50 ml) at room temperature for 8 hours, followed by filtering off deposited solids, washing the filtrate with an acid, then with alkali and further with water until the washing water because neutral, drying over anhydrous magnesium sulfate, distilling off the solvent, purifying the residue according to column chromatography and recrystallizing from methanol to obtain the objective S-2-(4'-(2-methyloctanoyloxy)-phenyl)-5-octyl-pyrimidine having a m.p. of 36.2° C. (0.5 g).

The proton NMR of this product was as follows:

| (CDCl$_3$ solution, TMS internal standard) | | |
| --- | --- | --- |
| δ(ppm) | | |
| 8.53 | s | 2 H |
| 8.45 | d (J = 9Hz) | 2 H |
| 7.20 | d (J = 9Hz) | 2 H |
| 2.90~2.27 | m | 3 H |
| 1.87~0.60 | m | 31 H |

Example 4 (Use example 1)

A nematic liquid crystal composition consisting of

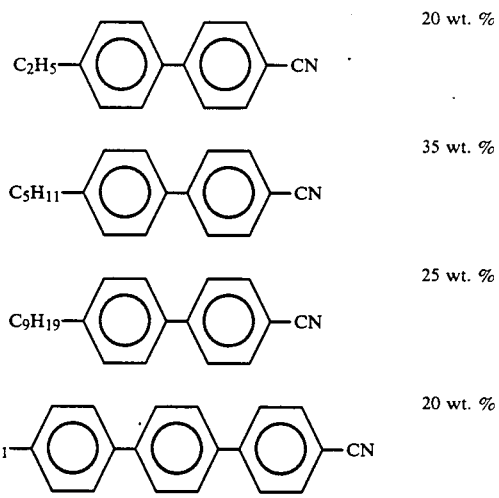

was filled in a cell provided with transparent electrodes, each obtained by applying polyvinyl alcohol (PVA) as an aligning agent thereonto and rubbing the resulting surface to subject it to a parallel aligning treatment, and having a distance between the electrodes of 10 μm to prepare a TN mode display cell, which was then observed under a polarizing microscope. As a result, a reverse twist domain was observed to be formed.

To the above nematic liquid crystal composition was added the following compound of the present invention in an amount of 0.1% by weight:

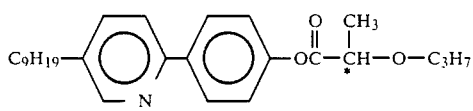

The resulting composition was similarly observed with a TN type cell. As a result, the reverse twist domain was dissolved and a uniform nematic phase was observed.

Example 5 (Use example 2)

The following liquid crystal composition consisting of achiral substances and having SC phase was prepared:

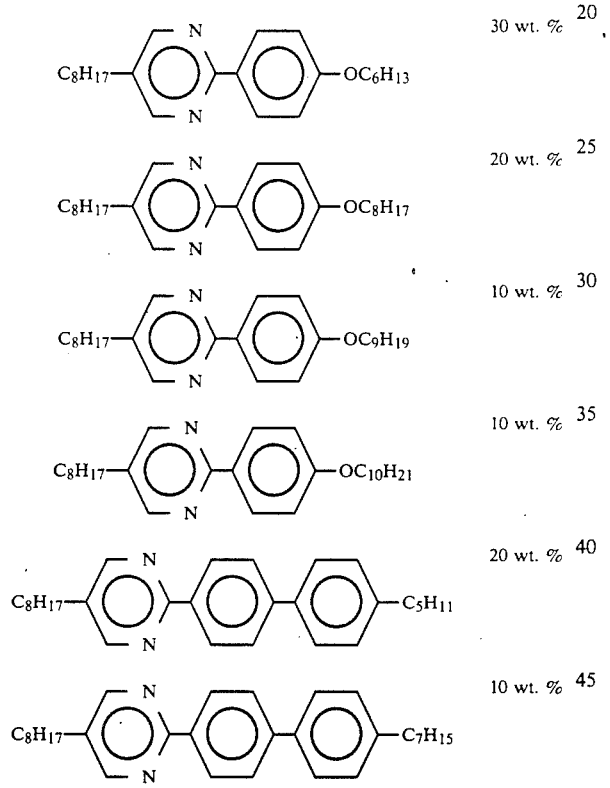

30 wt. %

20 wt. %

10 wt. %

10 wt. %

20 wt. %

10 wt. %

This liquid crystal composition A had the following phase transition points and exhibited no SC* phase:

To this liquid crystal composition was added a compound of the present invention in an amount of 20% by weight:

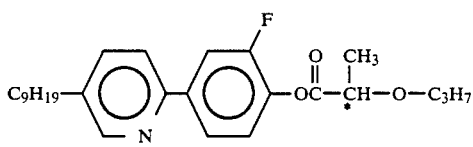

As a result, a SC* phase exhibiting ferroelectricity in a temperature range of 5° to 40° C. appeared. This composition had a spontaneous polarization value at 25° C. of 7.3 nC/cm² and a tilt angle of 10°. This composition was filled in a cell provided with transparent electrodes, each obtained by applying PVA as an aligning agent thereto and then rubbing the resulting surface to subject it to a parallel aligning treatment, and having a cell thickness of 2 μm, and further this cell was placed between two crossed polarizers and a square wave having a wave height of 10V was impressed. As a result, change in the intensity of transmitted light was observed. The response time was sought from the change in the intensity of transmitted light at that time to give 34 μsec at 25° C.

As described above, it was seen that when a compound of the present invention was added to a compound (or a composition) having SC phase exhibiting no ferro-electricity, a ferroelectric liquid crystal composition exhibiting very high speed response properties was obtained.

Example 6 (Use example 3)

To the liquid crystal composition A of Example 5 was added the following compound as a compound of the present invention (No. 1 in Table 1) in an amount of 20% by weight:

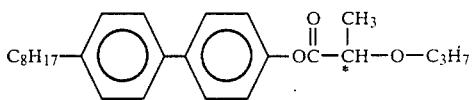

As a result, SC* phase exhibiting ferroelectricity appeared in a temperature range of 5° C. to 45° C. This composition had a spontaneous polarization at 25° C. of 11.1 nC/cm² and a tilt angle of 13°. This composition was filled in a cell the same as in Example 5 and placed between two crossed polarizers and a square wave having a wave height of 10V was impressed. As a result, change in the intensity of transmitted light was observed. The response time was light to give 43 μsec at 25° C.

As described above, it is seen that when the compound of the present invention is used, a ferroelectric liquid crystal composition exhibiting very high speed response properties is obtained.

Example 7 (Use example 4)

To the liquid crystal composition A of Example 5 was added the following compound as a compound of the present invention (No. 11 in Table 1) in an amount of 20% by weight:

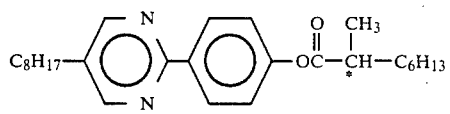

As a result, SC* phase appeared in a temperature range of 0° C. to 28° C. This composition had a spontaneous polarization at 25° C. of 1.4 nC/cm². With this composition, the response time was sought under the same conditions as in Example 5 to give 110 μsec.

Example 8 (Use example 5)

To a liquid crystal composition (ZLI-1132, tradename of a product manufactured by Merck Company)

was added the following compound as a compound of the present invention (No. 5 in Table 1) in an amount of 1% by weight:

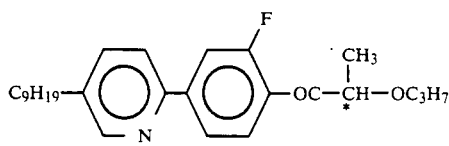

and the chiral pitch of the resulting chiral nematic liquid crystal composition was measured according to Cano wedge method. The results were as follows:

| Temperature (°C.) | Pitch (μm) |
| --- | --- |
| 20 | 18.1 |
| 30 | 19.1 |
| 40 | 20.1 |
| 50 | 21.2 |
| 60 | 22.1 |

As described above, when the compound of the present invention was added to a liquid crystal composition, it induced a chiral pitch which was short.

What we claim is:

1. An optically active compound expressed by the formula

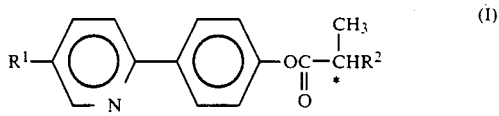

wherein $R^1$ represents an alkyl group 2–12 carbon atoms, $R^2$ represents an alkyl group of 3–8 carbon atoms, and * represents an unsymmetric carbon atom.

2. A liquid crystal composition comprising at least two components at least one of which is an optically active compound of the formula (I) as set forth in claim 1.

3. A liquid crystal composition according to claim 2, exhibiting chiral smectic phase.

4. A liquid crystal composition according to claim 2, exhibiting chiral nematic phase.

5. A liquid crystal display element containing a liquid crystal composition which comprises at least two components at least one of which is an optically active compound of the formula (I) as set forth in claim 1 and exhibits chiral smectic phase.

* * * * *